(12) United States Patent
Scholz et al.

(10) Patent No.: US 10,751,844 B2
(45) Date of Patent: Aug. 25, 2020

(54) METHOD FOR CONNECTING TUBES OF A SHELL AND TUBE HEAT EXCHANGER TO A TUBE BOTTOM OF THE SHELL AND TUBE HEAT EXCHANGER

(71) Applicant: LINDE AKTIENGESELLSCHAFT, Munich (DE)

(72) Inventors: Juergen Scholz, Munich (DE); Georg Wimmer, Tuessling (DE)

(73) Assignee: LINDE AKTIENGESELLSCHAFT, Munich (DE)

( * ) Notice: Subject to any disclaimer, the term of this patent is extended or adjusted under 35 U.S.C. 154(b) by 54 days.

(21) Appl. No.: 15/751,794

(22) PCT Filed: Aug. 9, 2016

(86) PCT No.: PCT/EP2016/001362
§ 371 (c)(1),
(2) Date: Feb. 9, 2018

(87) PCT Pub. No.: WO2017/025184
PCT Pub. Date: Feb. 16, 2017

(65) Prior Publication Data
US 2018/0236618 A1    Aug. 23, 2018

(30) Foreign Application Priority Data
Aug. 11, 2015    (EP) .................................... 15002388

(51) Int. Cl.
*B23P 15/26*    (2006.01)
*F28F 9/18*    (2006.01)
(Continued)

(52) U.S. Cl.
CPC .......... *B23P 15/26* (2013.01); *B23K 26/0884* (2013.01); *B23K 26/28* (2013.01);
(Continued)

(58) Field of Classification Search
CPC .............. B23P 15/26; F28D 7/024; F28F 9/18
See application file for complete search history.

(56) References Cited

U.S. PATENT DOCUMENTS

| | | | | |
|---|---|---|---|---|
| 3,540,529 A | * | 11/1970 | Horiuchi | F28F 9/18 165/134.1 |
| 3,878,871 A | * | 4/1975 | Anthony | B32B 15/016 138/140 |

(Continued)

FOREIGN PATENT DOCUMENTS

| | | | |
|---|---|---|---|
| CN | 201434511 Y | * | 3/2010 |
| CN | 103170724 B | * | 7/2015 |

(Continued)

OTHER PUBLICATIONS

Machine translation of the description of DE-102012017130-B4 (Year: 2012).*

(Continued)

*Primary Examiner* — Ryan J. Walters
*Assistant Examiner* — Michael W Hotchkiss
(74) *Attorney, Agent, or Firm* — Millen White Zelano & Branigan, PC; Brion P. Heaney (57) ABSTRACT

The present invention relates to a method for connecting tubes (221) of a shell and tube heat exchanger (200) to a tube bottom (230) of the shell and tube heat exchanger (200), wherein the tubes (221) and the tube bottom (230) are each made of aluminum or an aluminum alloy, and wherein the tubes (221) are connected to the tube bottom (230) by means of laser welding in a bonded manner.

18 Claims, 5 Drawing Sheets

(51) Int. Cl.
*F28F 21/08* (2006.01)
*F28D 7/02* (2006.01)
*F28D 7/16* (2006.01)
*B23K 26/08* (2014.01)
*B23K 26/28* (2014.01)
*B23K 101/14* (2006.01)

(52) U.S. Cl.
CPC .............. *F28D 7/024* (2013.01); *F28D 7/16* (2013.01); *F28F 9/18* (2013.01); *F28F 21/084* (2013.01); *B23K 2101/14* (2018.08); *F28F 2275/067* (2013.01); *F28F 2280/00* (2013.01)

(56) References Cited

U.S. PATENT DOCUMENTS

| | | | |
|---|---|---|---|
| 4,313,491 A * | 2/1982 | Molitor | F28D 7/024 165/83 |
| 4,451,960 A * | 6/1984 | Molitor | B21D 53/027 165/165 |
| 4,617,990 A * | 10/1986 | Franzolini | B23K 9/0288 165/173 |
| 5,088,192 A * | 2/1992 | Dempsey | F28D 7/024 29/726.5 |
| 5,595,670 A * | 1/1997 | Mombo-Caristan | B23K 15/006 219/121.64 |
| 5,749,414 A * | 5/1998 | Damsohn | F28F 9/18 165/158 |
| 6,076,597 A * | 6/2000 | Manning | F28D 7/024 165/163 |
| 6,492,040 B2 * | 12/2002 | Noishiki | B23K 35/286 165/133 |
| 6,651,333 B2 * | 11/2003 | Letrange | F28F 9/02 29/890.052 |
| 7,048,042 B2 * | 5/2006 | Juschka | F28D 7/1684 165/173 |
| 7,308,932 B2 * | 12/2007 | Doh | B01D 63/02 165/158 |
| 7,763,215 B2 * | 7/2010 | Sakai | B01J 19/0013 165/145 |
| 8,297,074 B2 * | 10/2012 | Spreemann | F28D 7/024 62/614 |
| 8,366,860 B2 * | 2/2013 | Daly | B29C 66/131 156/272.8 |
| 9,207,408 B1 * | 12/2015 | Di Teodoro | C03B 37/10 |
| 9,517,500 B2 * | 12/2016 | Neal | B21D 11/06 |
| 9,541,331 B2 * | 1/2017 | Nagurny | F28D 7/024 |
| 9,618,278 B2 * | 4/2017 | Denkenberger | B21D 53/045 |
| 9,636,733 B2 * | 5/2017 | Neal | B21D 11/06 |
| 9,989,182 B2 * | 6/2018 | Lowe | B23K 26/21 |
| 10,113,815 B2 * | 10/2018 | Eller | B23K 20/122 |
| 2002/0162651 A1 * | 11/2002 | Nakagome | F28F 9/0229 165/158 |
| 2004/0035910 A1 * | 2/2004 | Dockus | B23K 35/002 228/56.3 |
| 2005/0103482 A1 * | 5/2005 | Park | F28D 7/0008 165/140 |
| 2007/0144716 A1 * | 6/2007 | Doh | B01D 69/088 165/158 |
| 2008/0135219 A1 * | 6/2008 | Doh | B01D 63/02 165/156 |
| 2011/0011572 A1 | 1/2011 | Nagurny et al. | |
| 2013/0148193 A1 * | 6/2013 | Rothenberg | G02B 6/02042 359/341.44 |

FOREIGN PATENT DOCUMENTS

| | | | | |
|---|---|---|---|---|
| DE | 202013004743 U1 | 10/2013 | | |
| DE | 102012017130 A1 | 3/2014 | | |
| DE | 102012017130 B4 * | 6/2016 | ........... | B23K 26/032 |
| JP | 2006234232 A * | 9/2006 | .............. | F28D 7/16 |
| WO | 2011008921 A2 | 1/2011 | | |

OTHER PUBLICATIONS

ASM, Aluminum 5083-H116, Jan. 1, 2009, "Thermal Properties" Section, (Year: 2009).*
Machine Translation of JP-2006234232-A (Year: 2006).*
Machine Translation of CN-201434511-Y (Year: 2010).*
Machine Translation of CN-103170724-B (Year: 2015).*
ASM5083, Aluminum 5083, Jan. 2009, ASM, "Component" and "Thermal Properties" sections, <http://asm.matweb.com/search/SpecificMaterial.asp?bassnum=MA5083H116> (Year: 2009).*
ASM6061, Aluminum 6061, Feb. 2014, ASM, "Component" and "Thermal Properties" sections, <http://asm.matweb.com/search/SpecificMaterial.asp?bassnum=MA6061T6> (Year: 2014).*
AZO Materials, Aluminum Alloys—Aluminum 6063 Properties, Fabrication, and Applications, "Background", "Alloy Designations" and "Chemical Composition" sections, <https://www.azom.com/article.aspx?ArticleID=2812> (Year: 2012).*
International Search Report for PCT/EP2016/001362 dated Oct. 20, 2016.
English Abstract for DE202013004743, Publication Date: Oct. 1, 2013.
English Abstract for DE-102012017130, Publication Date: Mar. 6, 2014.

* cited by examiner

METHOD FOR CONNECTING TUBES OF A SHELL AND TUBE HEAT EXCHANGER TO A TUBE BOTTOM OF THE SHELL AND TUBE HEAT EXCHANGER

The invention relates to a method for connecting tubes of a shell and tube heat exchanger to a tubesheet of the shell and tube heat exchanger.

PRIOR ART

Shell and tube heat exchangers are designed to transfer heat from a first fluid to a second fluid. For this purpose, a shell and tube heat exchanger usually has a hollow cylinder, in the interior of which a multiplicity of tubes are arranged. One of the two fluids may be passed through the tubes, the other fluid through the hollow cylinder, in particular around the tubes. The tubes are fastened by their ends to tubesheets of the shell and tube heat exchanger along the circumference thereof.

In the course of the production process of a shell and tube heat exchanger, the tubes are connected by their ends to the tubesheets, for example in a material-bonding manner. Depending on the number of tubes, up to several tens of thousands of tube-tubesheet connections are thereby produced.

It is desirable to provide a possible way of connecting tubes of a shell and tube heat exchanger to a tubesheet of the shell and tube heat exchanger in a way that involves little effort and low costs and achieves high quality.

DISCLOSURE OF THE INVENTION

According to the invention, a method for connecting tubes of a shell and tube heat exchanger to a tubesheet of the shell and tube heat exchanger with the features of patent claim 1 is proposed. Advantageous configurations are the subject of the dependent claims and of the description which follows.

According to the invention, the tubes and the associated tubesheet are in each case produced from aluminum or an aluminum alloy. The tubes are connected to the tubesheet in a material-bonding manner by means of laser welding.

The shell and tube heat exchanger to be produced has in its finished, ready-to-operate state in particular a multiplicity of tubes, which may for example be arranged in the interior of a hollow cylinder. The shell and tube heat exchanger may in this case have several hundreds, several thousands or even in particular several tens of thousands of tubes. Furthermore, in particular at least one tubesheet, which may for example be designed as a plate, is provided in the finished shell and tube heat exchanger. The tubes are securely connected at their ends along the circumference thereof to this tubesheet or to these tubesheets. The tubesheet has in particular bores or holes, which substantially correspond in their diameter to the diameters of the tubes. In particular, each tube is fastened by one of its ends respectively to one of these bores.

The tubes may for example run straight within the hollow cylinder (so-called straight-tube heat exchanger). In this case, two tubesheets, which may be arranged at opposite ends of the straight-tube heat exchanger, are provided in particular. Each tube is fastened by one of its ends respectively to one of these two tubesheets in each case.

The tubes may for example also run in a U-shaped manner within the hollow cylinder (so-called U-tube heat exchanger). Such a U-tube heat exchanger may have only one tubesheet. Since the tubes are in this case bent in a U-shaped manner, they may be respectively fastened by both ends to the same tubesheet. It is also conceivable to use two tube sheets arranged next to one another.

In particular, the tubes are coiled within the hollow cylinder (so-called helically coiled shell and tube heat exchanger), i.e. the tubes run in particular in a circular or helical manner around an axis, in particular around a longitudinal axis or main axis of extent of the shell and tube heat exchanger. In particular, a core tube, around which the tubes are arranged in a circular or helical manner, may be provided in the interior of the hollow cylinder. Such a helically coiled shell and tube heat exchanger has in particular two tubesheets arranged at opposite ends.

In the course of the production of the shell and tube heat exchanger, the tubes are arranged within the shell and tube heat exchanger and aligned as desired. Then, the tubes are connected to the tubesheet or to the tubesheets in a material-bonding manner by laser welding. In the course of production, in particular up to 25 000 tube-tubesheet connections are in this way produced by means of laser welding. When all of the tubes have been connected in a material-bonding manner to the tubesheet, a shell that forms the hollow cylinder can be arranged around the tubes.

Laser welding or laser beam welding should be understood in this context as meaning in particular a process such as that defined as process 52 according to DIN EN ISO 4063 ("Welding and allied processes—Nomenclature of processes and reference numbers"). In this case, energy is introduced by a laser beam into workpieces that are to be connected.

The tubes and the tubesheet of the shell and tube heat exchanger are produced from aluminum or an aluminum alloy. Tubes and tubesheets may be produced from the same material or else from different materials. In particular, the tubes are produced from a first aluminum alloy and the tubesheet is produced from a second aluminum alloy.

The use of tubes and tubesheets of aluminum or an aluminum alloy means that the shell and tube heat exchanger is very much lighter than a conventional shell and tube heat exchanger produced from other materials, for example from steel or high-grade steel or chromium-nickel steel. The shell and tube heat exchanger of aluminum or an aluminum alloy consequently has an up to 50% lower mass than a corresponding shell and tube heat exchanger that is produced for example from chromium-nickel steel.

For working these tubes and tubesheets specifically, or for working workpieces of aluminum or an aluminum alloy in general, it should be remembered that aluminum reacts quickly with oxygen, thereby forming aluminum oxide $Al_2O_3$. For the sake of simplicity, the tubes and tubesheets of aluminum or an aluminum alloy that are connected to one another in a material-bonding manner in the course of production are referred to hereinafter as aluminum workpieces.

On the aluminum workpieces to be worked there consequently forms an oxide layer, which for working the aluminum workpieces should in particular be broken up or melted. Only when this oxide layer has been broken up can sufficient energy be introduced into the aluminum workpieces.

This oxide layer usually has a very much higher melting point than the aluminum workpiece lying thereunder. For example, the oxide layer may have a melting point between 2000° C. and 2100° C., in particular substantially of 2050° C. By contrast, depending on the exact composition, the aluminum workpiece lying thereunder may have a melting point between 500° C. and 700° C., in particular between 550° C. and 660° C.

Conventional welding methods, such as for example tungsten inert gas welding, are only conditionally suitable for welding the aluminum workpieces to one another. In particular, the manual tungsten inert gas welding of aluminum or aluminum alloys requires great dexterity and considerable experience on the part of the respective welder. It is is usually scarcely possible for tungsten inert gas welding of the aluminum workpieces to be automated. In particular if the tubes of the shell and tube heat exchanger have only a comparatively small spacing from one another on the tubesheet, and consequently there is a need in particular for an overwelding of neighboring seams, automated tungsten inert gas welding rarely leads to reproducibly acceptable results.

Laser welding allows the aluminum workpieces to be connected to one another in a particularly effective way that involves little effort and low costs. Laser welding allows the oxide layer on the aluminum workpieces to be broken up, and in particular completely melted, since in laser welding it is possible in particular for a comparatively high concentration of energy to be achieved by the laser beam. Energy can be introduced particularly effectively into the underlying aluminum workpieces, and the aluminum workpieces can be worked as desired.

Laser welding offers considerable advantages for the material-bonding connection of the aluminum workpieces in comparison with other welding methods. With other welding methods, for example tungsten inert gas welding, it is usually not possible to melt the entire oxide layer. Unmelted oxides of the oxide layer from a gap between the tube and the tubesheet in that case remain in the weld metal, which is referred to as oxide inclusions. Such oxide inclusions represent a clear separation or defect in the weld metal and in the weld seam. The creation of such oxide inclusions can be prevented by laser welding, and a neat, clean connection or weld seam without such defects can be produced between the tube and the tubesheet.

On the other hand, such problems and disadvantages do not occur at all in the case of other shell and tube heat exchangers that are not produced from aluminum or aluminum alloys, but for example from steel or high-grade steel or chromium-nickel steel. Since no oxide layer forms in the case of such materials, this factor does not have to be taken into consideration in the production of a corresponding shell and tube heat exchanger. The invention provides a possible way of being able to overcome effectively the specific disadvantages and problems that arise in the production of a shell and tube heat exchanger produced from aluminum or from aluminum alloys.

Still further advantages can be additionally achieved by laser welding of the tube-tubesheet connections of the shell and tube heat exchanger produced from aluminum or from aluminum alloys. In the case of laser welding, a welding rate that is comparatively very high can be achieved, whereby the tube-tubesheet connections can be produced particularly quickly and efficiently. Furthermore, reproducible tube-tubesheet connections can be produced with consistent quality by means of laser welding. In particular, with laser welding comparatively narrow weld seams can be created, whereby it is possible to avoid weld seams of neighboring tubes influencing one another.

The comparatively thick tubesheet (in particular in comparison with the wall thickness of the tubes) has in particular a comparatively high thermal conductivity, so that heat introduced is dissipated very quickly. On the other hand, the comparatively thin or thin-walled tubes expediently have a comparatively low thermal conductivity, so that heat introduced cannot be dissipated quickly. Laser welding allows sufficient energy to be introduced into the tubesheet to melt it in spite of its comparatively high thermal conductivity. It can nevertheless be ensured that the tubes are not melted back prematurely.

Furthermore, the laser welding of the aluminum workpieces can be carried out in an automated manner. As already explained further above, automation of tungsten inert gas welding of the aluminum workpieces is scarcely possible. Laser welding is carried out in particular with a precisely aligned, concentrated laser beam, which can be moved along and repositioned in an easy way, in particular by an expedient automated control. The laser welding, and consequently the production of the tube-tubesheet connection, can be easily carried out in an automated manner.

The tubes are advantageously connected to the tubesheet in a material-bonding manner by means of deep welding. Deep welding is a specific configuration of laser welding. In deep welding, the intensity of the laser beam produced lies above a predetermined limit value, preferably above a limit value of 1 $MW/cm^2$, 2 $MW/cm^2$ or 4 $MW/cm^2$. The aluminum material is melted by the laser beam at the welding location. This comparatively high intensity causes part of the aluminum material to evaporate, whereby a metal vapor is produced. Further absorption of the laser energy has the effect that this metal vapor is at least partially ionized, whereby a laser-induced plasma or metal vapor plasma is produced The high intensity of the laser beam also has the effect that a welding capillary also referred to as a "keyhole" forms in the melt. This welding capillary is formed as a cavity, which is filled with the metal vapor plasma. Since the degree of absorption of the metal vapor plasma is in particular higher than the degree of absorption of the melt, the energy of the laser beam can be introduced almost completely into the aluminum workpiece.

According to a preferred embodiment of the invention, before the laser welding, the tubes of the shell and tube heat exchanger are connected in a form-fitting manner to the tubesheet of the shell and tube heat exchanger. Particularly preferably, a helically coiled shell and tube heat exchanger is thereby produced. In the course of the production process of the shell and tube heat exchanger, preferably the helically coiled shell and tube heat exchanger, the following steps are advantageously carried out:

Preferably, a first tubesheet is arranged at a first end of a core tube of the shell and tube heat exchanger. A second tubesheet is preferably arranged at a second end of the core tube. The tubesheets are arranged in particular at opposite ends of the core tube with respect to the longitudinal axis or main axis of extent thereof. The tubesheets may in this case be fastened radially, for example by way of supporting arms, or at the end faces.

Advantageously, the tubes are in each case introduced or threaded, in particular inserted, by one end into bores in the first tubesheet, and are in this way connected to the first tubesheet in a form-fitting manner. Expediently, one tube is in each case respectively introduced into one bore. The tubes are then preferably coiled around the core tube. The core tube is in particular rotatably mounted, for example by way of running rings on roller blocks. The tubes are in particular coiled helically around the core tube while the latter is rotated. The tubes coiled around the core tube are in each case introduced or threaded, in particular inserted, by their other end into bores in the second tubesheet, and in this way are connected in particular to the second tubesheet in a form-fitting manner. These steps may be carried out individually for each tube or else simultaneously for an expedient number of tubes.

In particular, the tubes are coiled around the core tube in different layers, each comprising a certain number of tubes. The tubes are preferably coiled around the core tube in such a way that the core tube bears the load of the tubes. A predetermined spacing between these individual layers is set by means of spacers. It is in this way ensured that, in the finished, ready-to-operate shell and tube heat exchanger, a fluid can flow through it, around the tubes. In order to avoid a bypass between the outermost layer of tubes and a shell of the shell and tube heat exchanger, for example a sheet-metal casing may be wrapped around this outermost layer of tubes.

Once all of the tubes have been coiled around the core tube in the desired way, the tubes are fastened to the tubesheets. For this purpose, the tubes are connected in a material-bonding manner to the first tubesheet and to the second tubesheet by means of laser welding. Once all of the tubes have been connected to the tubesheets in a material-bonding manner, the casing can be arranged around the tubes, which in particular forms a hollow cylinder.

The tubes preferably have in each case a maximum wall thickness of 2.0 mm. The tubesheet preferably has a thickness between 100 mm and 200 mm. The tubes and/or the tubesheet are preferably respectively produced from an alloy of aluminum, magnesium, manganese, silicon and/or copper. The magnesium content of the alloy may in this case preferably be between 4.0% and 4.9%, the manganese content preferably between 0.4% and 1.0%.

For example, the tubes and/or tubesheets may be respectively produced from an AlMgSiCu alloy, for example from the aluminum alloy 6061 with a manganese content of at most 0.15%, a magnesium content between 0.8% and 1.2%, a silicon content between 0.4% and 0.8% and a copper content between 0.15% and 0.4%.

The tubes and/or tubesheets may also be respectively produced from an AlMgSi alloy, for example from the aluminum alloy 6063 with a manganese content of at most 0.1%, a magnesium content between 0.45% and 0.9%, a silicon content between 0.2% and 0.6% and a copper content of at most 0.1%.

It goes without saying that the tubes and the tubesheet may in this case be produced from the same alloy or that the alloys of the individual tubes and of the tubesheet may also be different in each case. Advantageously, the tubes and/or the tubesheet respectively have a thermal conductivity between 10 W/mK and 140 W/mK.

Preferably, in the course of the laser welding a laser beam is produced and focused by means of optical elements. The laser beam may in this case be advantageously produced by a fiber laser, a diode laser or else by a solid-state laser, preferably by a carbon dioxide laser or an Nd:YAG laser. The optical elements form a focusing optical system, by means of which the laser beam can be focused precisely onto the location to be welded. Preferably, the laser welding may also be carried out with double focus. In this case, the laser beam is divided into two laser beams, for example by a deflecting mirror in the focusing optical system. The laser beam may preferably be guided by means of an optical waveguide, in particular by means of a fiber-optic cable. Advantageously, a filler may be supplied in the course of the laser welding. Also preferably supplied is a shielding gas or process gas, preferably argon, helium, nitrogen, carbon dioxide, oxygen or a mixture of these gases mentioned. The laser welding may however also expediently be carried out without supplying shielding gas and/or filler.

Further advantages and configurations of the invention are evident from the description and the accompanying drawing.

It goes without saying that the features mentioned above and still to be explained below can be used not only in the respectively specified combination but also in other combinations or on their own without departing from the scope of the present invention.

The invention is schematically represented in the drawing on the basis of an exemplary embodiment and is described in detail below with reference to the drawing.

Figure 1A:
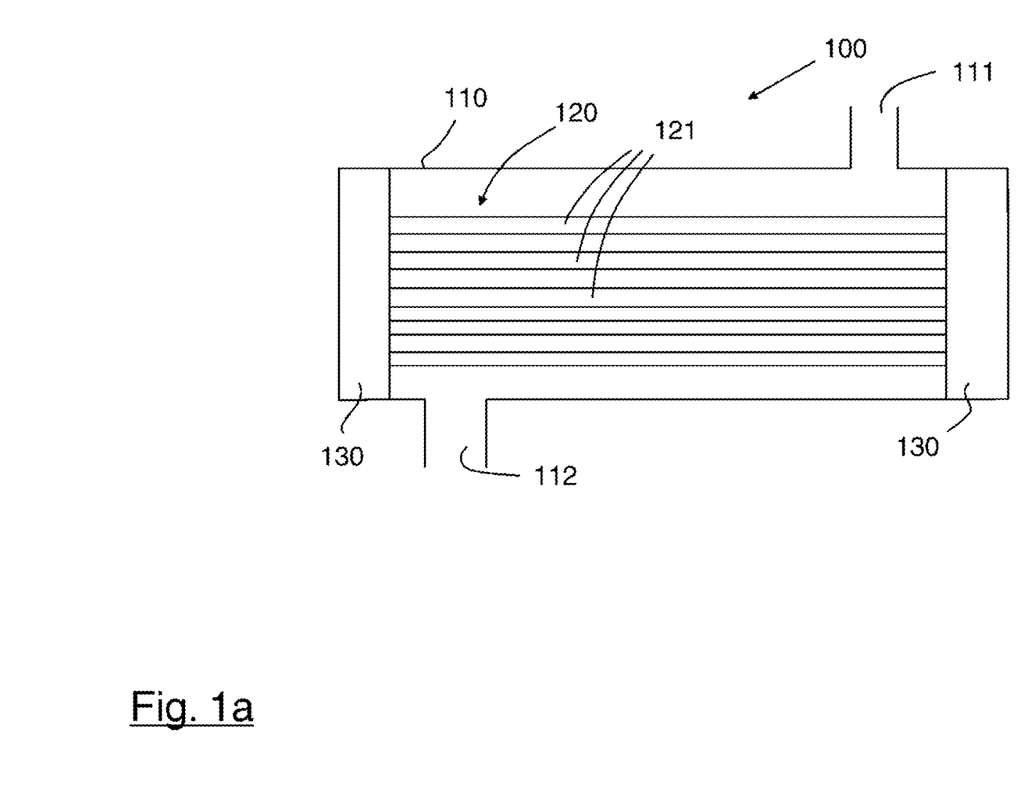
FIGS. 1a and 1b are, respectively, sectional and perspective views of a preferred configuration of a shell and tube heat exchanger which has been produced by means of a preferred embodiment of a method according to the invention.
Figure 1B:
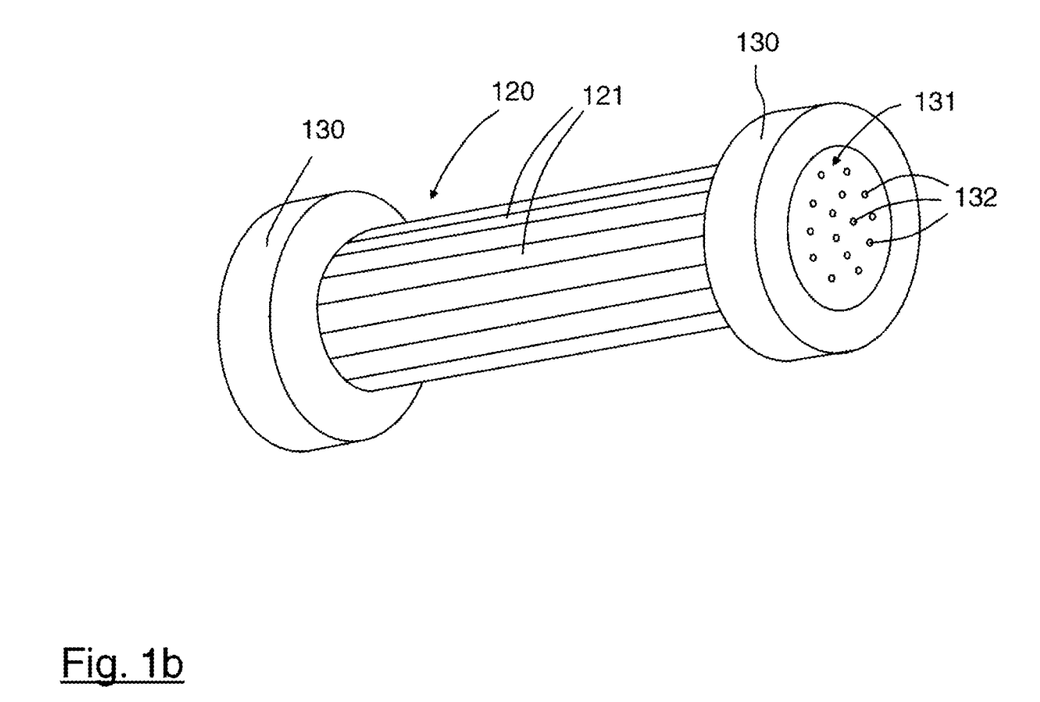

In FIGS. 1a and 1b, a preferred configuration of a shell and tube heat exchanger is schematically shown and denoted by 100. In FIG. 1a, the shell and tube heat exchanger 100 is shown in a sectional view. In this example, the shell and tube heat exchanger 100 is formed as a straight-tube heat exchanger.

The straight-tube heat exchanger 100 has a shell 110, which has a fluid inlet 111 and a fluid outlet 112 in order to pass a first fluid through the shell 110.

Arranged within the shell 110 is a bundle of tubes 120 comprising a multiplicity of straight-running tubes 121. A second fluid may be passed through the tubes. The individual tubes 121 are connected in a material-bonding manner to tubesheets 130 of the straight-tube heat exchanger 100. The tubesheets 130 may for example be fastened to the ends of the shell 110.

The straight-tube heat exchanger 100, the tubes 121 and the tubesheets 130 are produced from an aluminum alloy, in particular from an aluminum-magnesium-manganese alloy. For example, the tubes 120 and the tubesheets 130 are produced from the material EN AW-5083 or EN AW-AlMg4.5Mn0.7 with the material number DIN 3.3547, that is to say from an aluminum alloy with a proportion of manganese of between 0.4% and 1.0% and with a proportion of magnesium of between 4.0% and 4.9%.

In FIG. 1b, part of the straight-tube heat exchanger 100 from FIG. 1a is shown in a perspective view. In FIG. 1b, only the bundle of tubes 120 and the tubesheets 130 are shown.

As can be seen in FIG. 1b, the tubesheets 130 have bores 132. These bores 132 are arranged in a bore region 131 of the respective tubesheet 130. Each of the tubes 121 of the bundle of tubes 120 is connected in a material-bonding manner to the respective tubesheet 130 at one of these bores 132. In the course of a production process, these material-bonding tube-tubesheet connections are produced by means of laser welding, as described in detail further below with reference to FIG. 3.

Figure 2A:
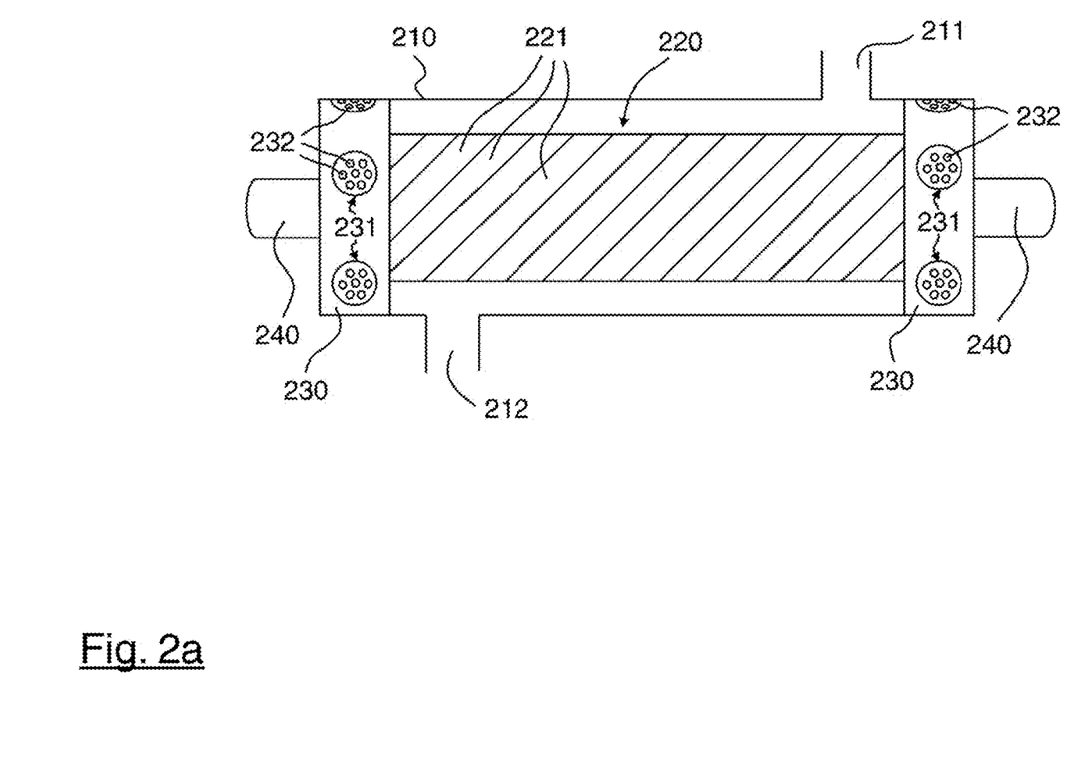
FIGS. 2a and 2b are, respectively, sectional and perspective views of a further preferred configuration of a shell and tube heat exchanger which has been produced by means of a preferred embodiment of a method according to the invention.
Figure 2B:
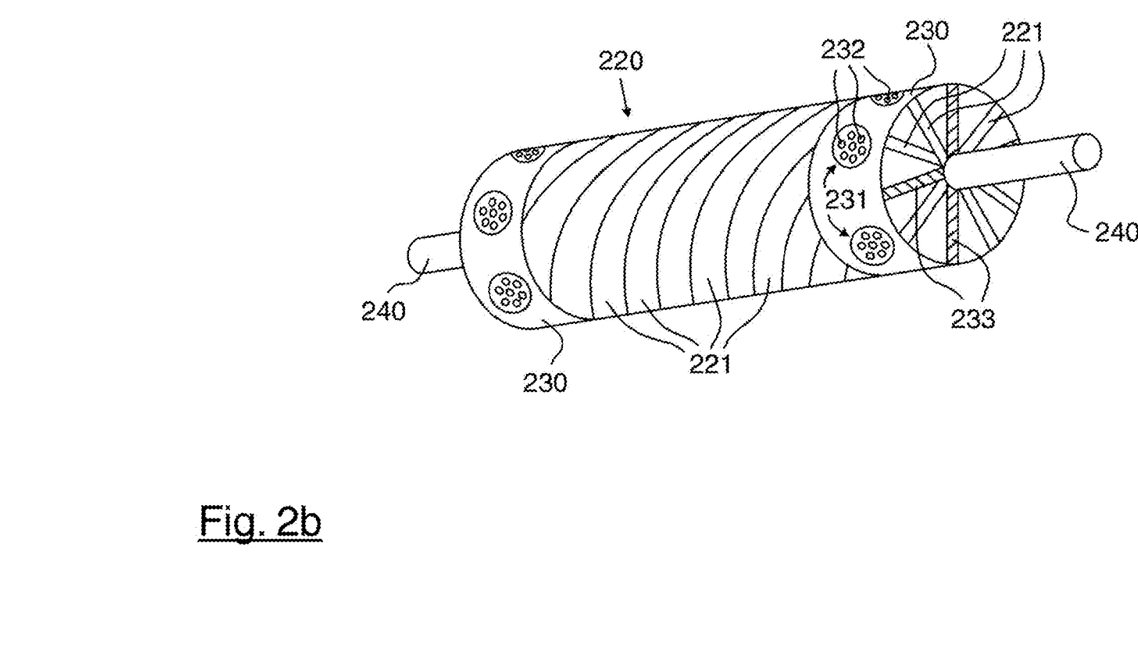

In FIGS. 2a and 2b, a further preferred configuration of a shell and tube heat exchanger is schematically shown and denoted by 200. In FIG. 2a, the shell and tube heat exchanger 200 analogous to FIG. 2a is shown in a sectional view. The shell and tube heat exchanger 200 is formed for example as a helically coiled shell and tube heat exchanger.

By analogy with the straight-tube heat exchanger 100 from FIGS. 1a and 1b, the helically coiled shell and tube heat exchanger 200 also has a shell 210 with a fluid inlet 211 and a fluid outlet 212, arranged in the interior of which is a bundle of tubes 220 comprising a multiplicity of tubes 221.

By contrast with the straight-tube heat exchanger 100, the tubes 210 of the helically coiled shell and tube heat exchanger 200 do not run in a straight line, but are coiled helically around a core tube 240. Tubesheets 230 of the helically coiled shell and tube heat exchanger 200 have along their circumference bore regions 231 with bores 232, each of the tubes 221 of the bundle of tubes 220 being connected in a material-bonding manner to the respective tubesheet 230 at one of these bores 232.

The tubes 221 and tubesheets 230 are also preferably produced from an aluminum alloy, for example from the material EN AW-5083 or EN AW-AlMg4.5Mn0.7.

In FIG. 2b, part of the helically coiled shell and tube heat exchanger 200 (the bundle of tubes 220, the tubesheets 230 and the core tube 240) from FIG. 2a is shown in a perspective view. As can be seen in FIG. 2b, the tubesheets 230 are fastened to the core tube 240 for example by way of supporting arms 233.

Figure 3:
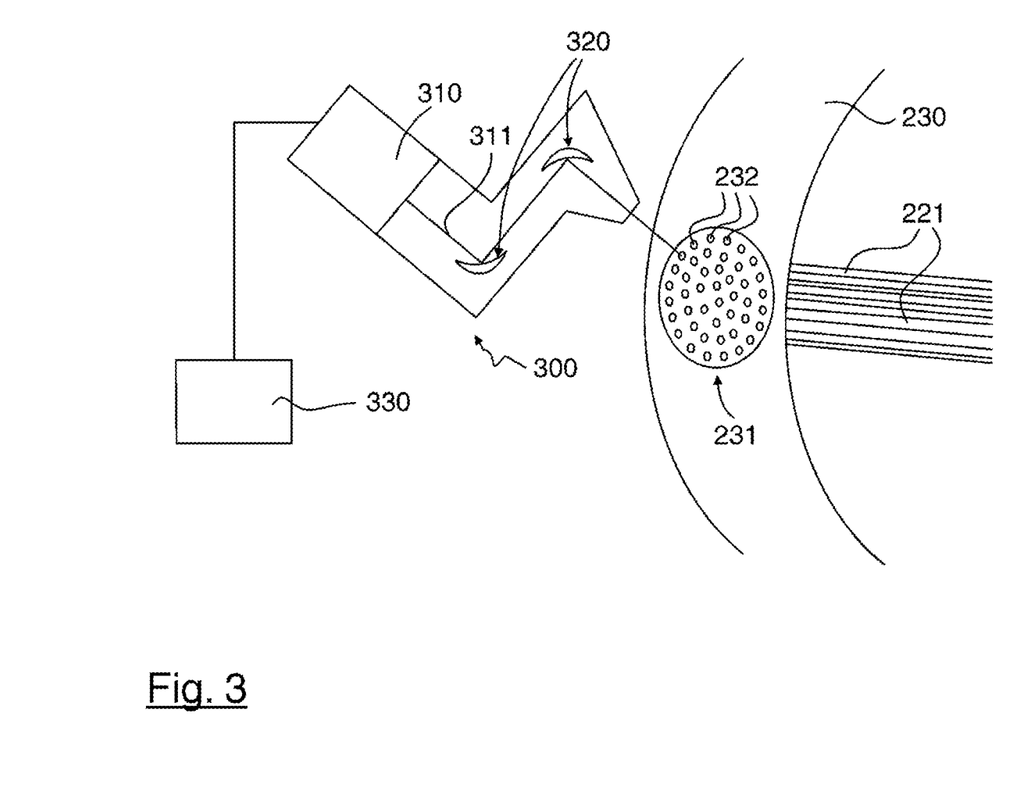
FIG. 3 schematically shows a device which is designed to carry out a preferred embodiment of a method according to the invention.

In FIG. 3, a device which is designed to carry out a preferred embodiment of a method according to the invention is schematically shown.

In FIG. 3, it is shown by way of example how with this device the tubes 221 are connected in a material-bonding manner to one of the tubesheets 230 of the helically coiled shell and tube heat exchanger 200 according to FIGS. 2a and 2b in the course of a production process.

The device comprises a laser welding unit 300. A laser 310, for example an Nd:YAG laser, produces a laser beam 311, which can be focused by means of a focusing optical system 320 comprising expedient optical elements onto a location to be welded on the tubesheet 230. The focusing optical system 320 may for example have concave mirrors, which focus the laser beam 311 onto the location to be welded.

A control unit 330 is designed to activate the laser 310 and the focusing optical system 320, in particular to move the laser beam 311 along and reposition and refocus it on the tubesheet. The control unit 330 provides automated control of the laser welding and allows automated production of the tube-tubesheet connections.

It goes without saying that the device can also be used in an analogous way for producing the material-bonding connection between the tubes 122 and the tubesheets 130 of the straight-tube heat exchanger 100 according to FIGS. 1a and 1b, or generally for producing a material-bonding connection between tubes and tubesheets of some other shell and tube heat exchanger.

LIST OF REFERENCE NUMERALS

100 Shell and tube heat exchanger, straight-tube heat exchanger
110 Shell
111 Fluid inlet
112 Fluid outlet
120 Bundle of tubes
121 Tubes
130 Tubesheets
131 Bore region
132 Bores
200 Shell and tube heat exchanger, helically coiled shell and tube heat exchanger
210 Shell
211 Fluid inlet
212 Fluid outlet
220 Bundle of tubes
221 Tubes
230 Tubesheets
231 Bore region
232 Bores
233 Supporting arms
240 Core tube
300 Laser welding unit
310 Laser, Nd:YAG laser
311 Laser beam
320 Focusing optical system
330 Control unit

The invention claimed is:

1. A method for connecting tubes of a shell and tube heat exchanger to a tubesheet of the shell and tube heat exchanger, said method comprising:
providing tubes and said tubesheet produced from aluminum or an aluminum alloy, wherein the tubes have in each case a maximum wall thickness of 2.0 mm and wherein the tubesheet has a thickness between 100 mm and 200 mm, and
connecting said tubes to said tubesheet in a material-bonding manner by means of laser welding using a laser beam,
wherein said laser beam during said laser welding has an intensity above 1 MW/cm$^2$.

2. The method as claimed in claim 1, wherein the laser beam during said laser welding has an intensity above 2 MW/cm$^2$.

3. The method as claimed in claim 1, wherein the tubes and/or the tubesheet respectively have a thermal conductivity between 10 W/mK and 140 W/mK.

4. The method as claimed in claim 1, wherein the tubes and/or the tubesheet are respectively produced from an alloy of aluminum that contains magnesium, manganese, silicon and/or copper.

5. The method as claimed in claim 1, wherein the laser beam during said laser welding has an intensity above 4 MW/cm$^2$.

6. The method as claimed in claim 1, wherein the tubes and the tubesheet each have a thermal conductivity between 10 W/mK and 140 W/mK.

7. The method as claimed in claim 1, wherein the tubes and/or the tubesheet are respectively produced from an alloy of aluminum containing between 4.0% and 4.9% magnesium.

8. The method as claimed in claim 1, wherein the tubes and/or the tubesheet are respectively produced from an alloy of aluminum containing between 0.4% and 1.0% manganese.

9. The method as claimed in claim 1, wherein the tubes and/or the tubesheet are respectively produced from an AlMgSiCu alloy.

10. The method as claimed in claim 1, wherein the tubes and/or the tubesheet are respectively produced from an aluminum alloy containing at most 0.15% manganese, between 0.8% and 1.2% magnesium, between 0.4% and 0.8% silicon, and between 0.15% and 0.4% copper.

11. The method as claimed in claim 1, wherein the tubes and/or the tubesheet are respectively produced from an AlMgSi alloy.

12. The method as claimed in claim 1, wherein the tubes and/or the tubesheet are respectively produced from an aluminum alloy containing at most 0.1%, between 0.45% and 0.9% magnesium, between 0.2% and 0.6% silicon, and at most 0.1% copper.

13. The method as claimed in claim 1, wherein the laser beam is focused by means of optical elements.

14. The method as claimed in claim 13, wherein the laser beam is guided by means of an optical waveguide.

15. The method as claimed in claim 13, wherein the laser beam is produced by a fiber laser, a diode laser or a solid-state laser.

16. The method as claimed in claim 13, wherein the laser beam is guided by means of a fiber-optic cable.

17. The method as claimed in claim 1, wherein, before the laser welding, the tubes of the shell and tube heat exchanger are connected in a form-fitting manner to the tubesheet of the shell and tube heat exchanger.

18. The method as claimed in claim 17, wherein
a first tubesheet is arranged at a first end of a core tube of the shell and tube heat exchanger and wherein a second tubesheet is arranged at a second end of the core tube,
each of the tubes has a first end and a second end,
the first end of each of the tubes is introduced into a bore in the first tubesheet,
the tubes are coiled around the core tube,
the second end of each of the tubes coiled around the core tube is introduced into a bore in the second tubesheet, and subsequently
the tubes are connected to the first tubesheet and to the second tubesheet in a material-bonding manner by means of laser welding.

* * * * *